United States Patent
Wang

[11] Patent Number: 5,944,260
[45] Date of Patent: Aug. 31, 1999

[54] WATER-DROPPING TAPE FOR CROPS

[76] Inventor: Hee Gee Wang, 203 Yangjai Village 249-8 Yangjai - dong, Seocho-gu, Seoul, Rep. of Korea

[21] Appl. No.: 09/099,895

[22] Filed: Jun. 18, 1998

[30] Foreign Application Priority Data

Jun. 18, 1997 [KR]  Rep. of Korea ..................... 97-25555

[51] Int. Cl.$^6$ .................................................. B05B 15/00
[52] U.S. Cl. .......................... 239/542; 239/547; 239/562; 239/566
[58] Field of Search .................................. 239/542, 547, 239/562, 566

[56] References Cited

U.S. PATENT DOCUMENTS

| | | | |
|---|---|---|---|
| 4,246,936 | 1/1981 | Luz et al. ................................ | 138/103 |
| 5,375,770 | 12/1994 | Roberts ................................ | 239/522.13 |
| 5,520,339 | 5/1996 | Kuo ........................................ | 239/542 |
| 5,620,143 | 4/1997 | Delmer et al. .......................... | 239/542 |

*Primary Examiner*—Andres Kashnikow
*Assistant Examiner*—Jorge Bocanegra
*Attorney, Agent, or Firm*—Nathan N. Kallman

[57] ABSTRACT

A water-dropping tape for crops includes: a single snaking passage formed in the middle of a water path forming component disposed between the inner and outer end portions of a film-like main wall; a plurality of water entrance portions arranged at predetermined intervals; a water discharge portion disposed in the middle of the snaking passage between the water entrance portions; first and second water inlets formed in the side wall of the water path forming component and the inner end portion of the main wall, and disposed in a region of the water entrance portion; and water outlets formed in the outer end portion of the main wall, and disposed in a region of the water discharge portion.

4 Claims, 3 Drawing Sheets

WATER-DROPPING TAPE FOR CROPS

BACKGROUND OF THE INVENTION

1. Field of the Invention

The present invention relates to a water-dropping tape and, more particularly, to a water-dropping tape which is easy to handle, and-adapted to drop water with even distribution all over the area and prevent water paths from being clogged, thereby prolonging the life in use to a great extend.

2. Discussion of Related Art

In the conventional water-dropping tape used to supply water continuously to plants, based on a water-dropping procedure, the water flow passages are formed in two rows and have a wide water flow passage area. In such case, it is difficult to attach the water-dropping tape to a main water supply pipe with an effective seal. In such a construction, the water paths are approximately 0.5 mm in width and 1.5 mm high and ready to be blocked by sediment, however, no openings for withdrawal of sediment are provided. Moreover, a water entrance port extending to the water path is disposed only on a single side of the water-dropping tape so that the water paths are easily clogged with sediment, which reduces the life of the tape and leads to deterioration in the reliability of the tape.

SUMMARY OF THE INVENTION

Accordingly, an object of the present invention is to provide a water-dropping tape which is easy to handle, and adapted to drop water with even distribution all over the area and prevent flow paths from being clogged, thereby prolonging the life for use to a great extent.

In an aspect of the present invention, a water-dropping tape for crops includes: a single snaking passage formed in the middle of a water path forming component disposed between the inner and outer end portions of a film-like main wall; a plurality of water entrance portions arranged at predetermined intervals; a water discharge portion disposed in the middle of the snaking passage between the water entrance portions; first and second water inlets formed in the side wall of the water path forming component and the inner end portion of the main wall, and disposed in a region of the water entrance portion; and water outlets formed in the outer end portion of the main wall, and disposed in a region of the water discharge portion.

BRIEF DESCRIPTION OF THE ATTACHED DRAWINGS

DETAILED DESCRIPTION OF PREFERRED EMBODIMENT

Hereinafter, the present invention will be described by way of an illustrative embodiment with reference to the drawings.

Figure 1:
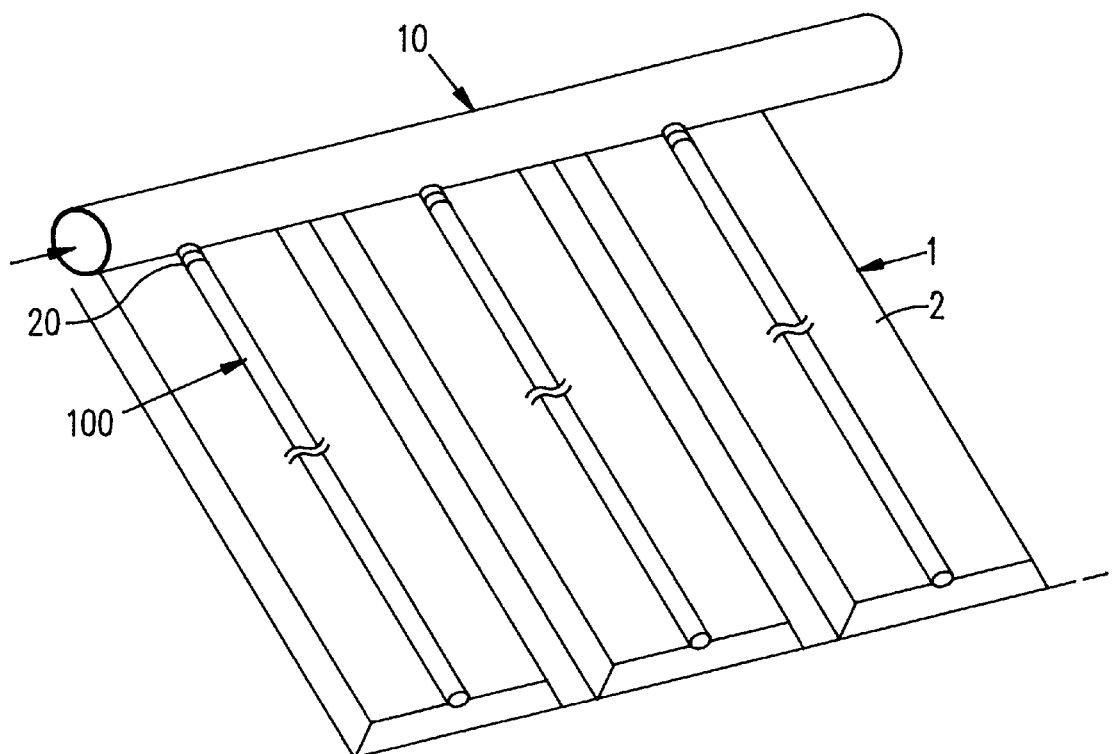
FIG. 1 is a perspective view illustrating a water-dropping tape for crops installed for use in accordance with the present invention.

Referring to FIG. 1, a main water pipe 10 is arranged over a field 1 and a plurality of water-dropping tapes 100 of the present invention are connected to the main water pipe 10 via connections 20 over each of unit banks 2 around the field 1.

As water is supplied to the main water pipe 10, it is distributed to a plurality of water-dropping tapes 100 which are branched from the main water pipe 10 so that crops in the field 1 may absorb water droplets uninterruptedly generated from the water-dropping tapes 100 in a small amount.

Figure 2:
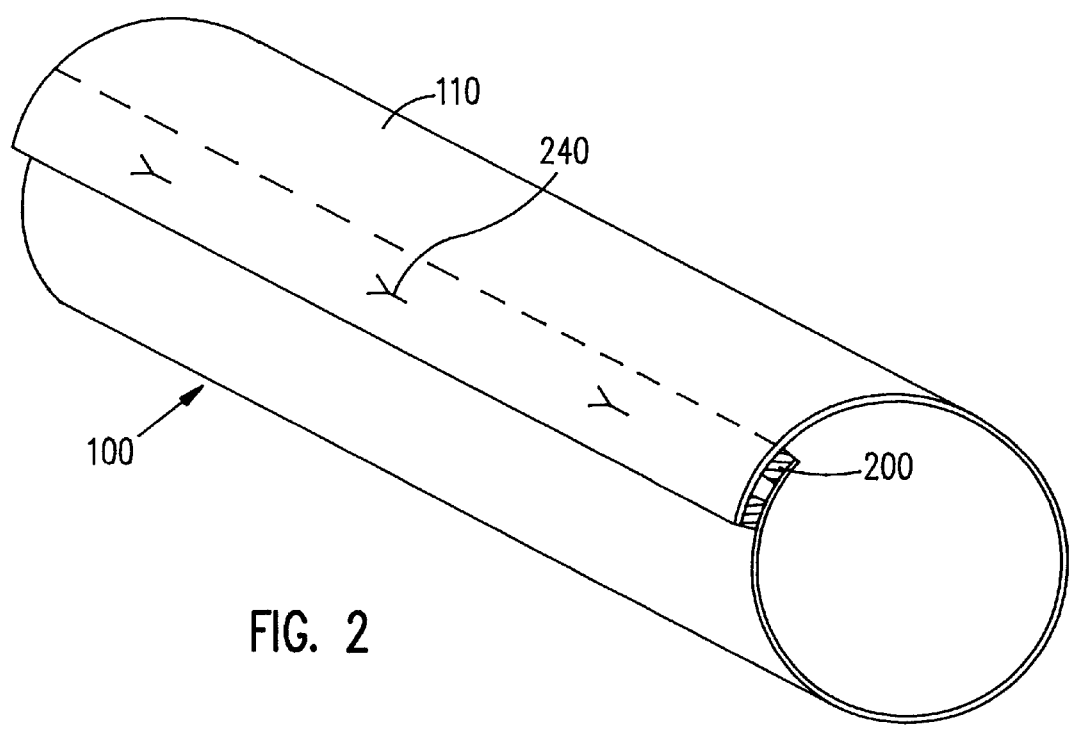
FIG. 2 is a partial perspective view of the water-dropping tape in the present invention.
Figure 3:
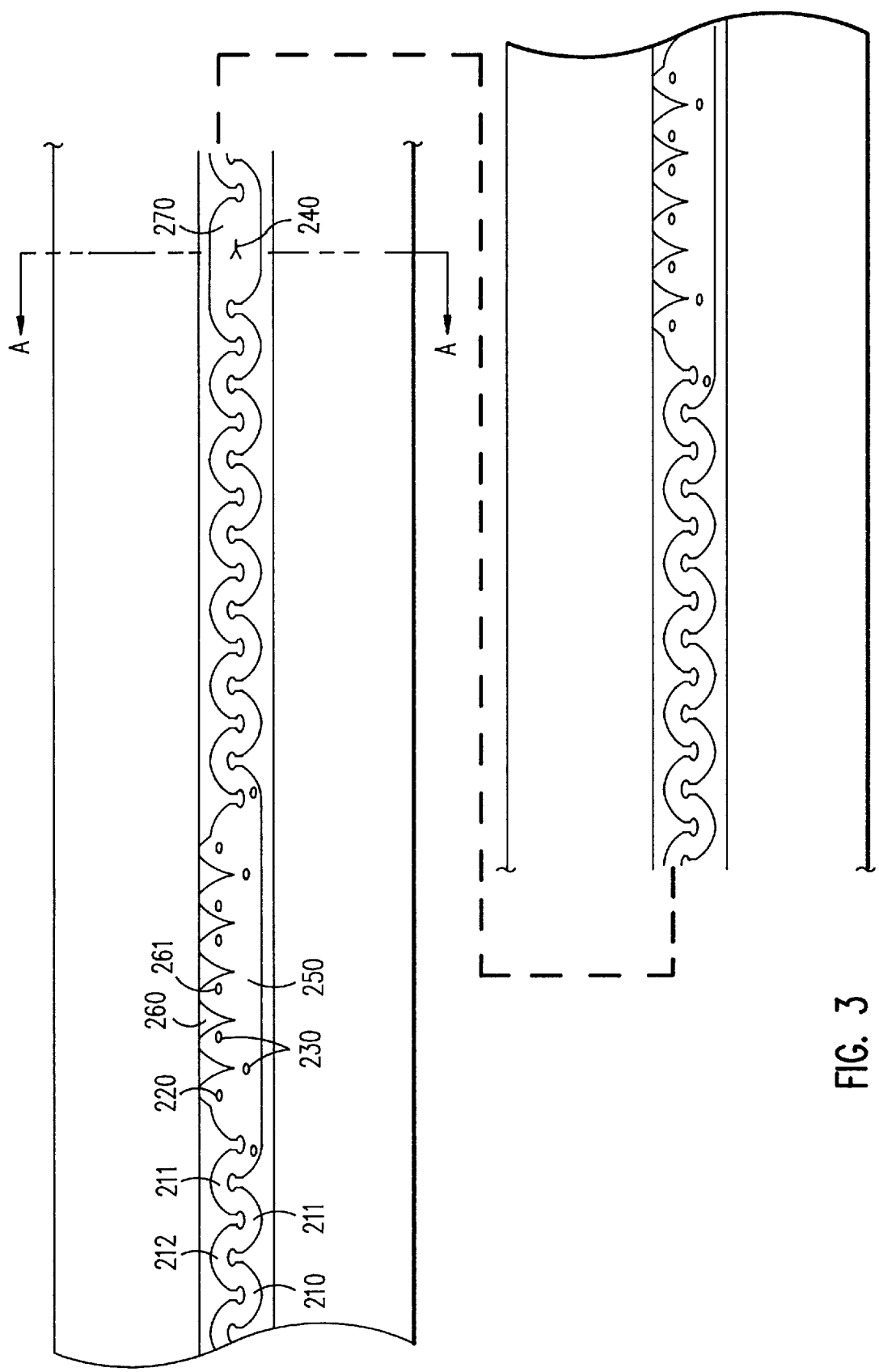
FIG. 3 is a partial plan view of the water-dropping tape in the present invention.

Water-dropping tape 100 is wound on a round ring in the tape form and is cut to length in accordance with the length of a patch of the field 1. While the water-dropping tape 100 is filled with water, it becomes inflated in the form of a round tube by way of water pressure, as illustrated in FIG. 2.

Referring to FIGS. 1–4, the water-dropping tape 100 of the present invention is formed from a synthetic resin, having both end portions of a film-type main wall 110 overlapped with each other in a predetermined width, and a water path forming component 200 disposed therein.

A snaking passage 210 is formed in the middle of the water path forming component 200 in order to drop the water pressure by friction with water stream, and a plurality of first water inlets 220 are formed in the inner surface of the water path forming component 200. The main wall 100 has a plurality of second water inlets 230 formed in the inner end portion in communications with the snaking passage 210 and a plurality of water outlets 240 formed in the outer end portion, so that the water supplied to the water-dropping tape 100 flows into the snaking passage 210 through the first and second water inlets 220 and 230 and is discharged from the passage 210 through the water outlets 240.

The snaking passage 210 of the water path forming component 200 is provided with reciprocal bends 211, wherein a spheroidal projection 212 is integrally formed at the top of each bend 211.

Water entrance portions 250 are disposed at predetermined intervals in the water path forming component 200, wherein the first water inlets 220 are formed on the side wall of the water entrance portion 250 and the second water inlets 230 are positioned in the region of the water entrance portion 250.

Between the first water inlets 220 formed on the side wall of the water entrance portion 250 are positioned wedge-shaped projections 260 having both sides are formed with curved surfaces 261. The second water inlets 230 formed at the bottom of the water entrance portions 250, that is, the inner end portions of the main wall 110 have a spheroidal shape. The second water inlets 230 of the water entrance portions 250 are positioned between the wedge-shaped projections 260 such that some of them are disposed on the lateral side of the projections 250 and others are arranged in the lengthwise direction in the middle of the projections 250.

Water discharge portions 270 are formed in the middle of the snaking passage 210 which is located between the water entrance portions 250, and the water outlets 240 configured in the Y-character form are positioned in correspondence to the water discharge portions 270.

Figure 5:
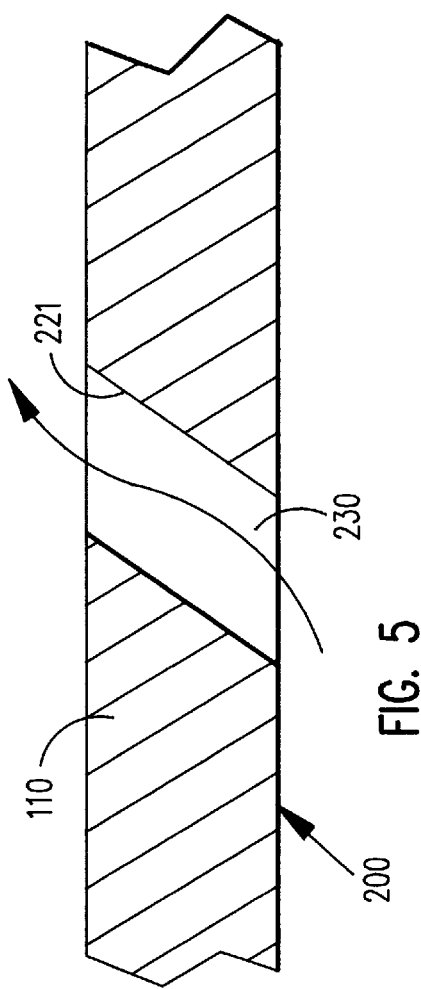
FIG. 5 is a cross-sectional view showing the principal part of the water-dropping tape in the present invention.
Figure 4:
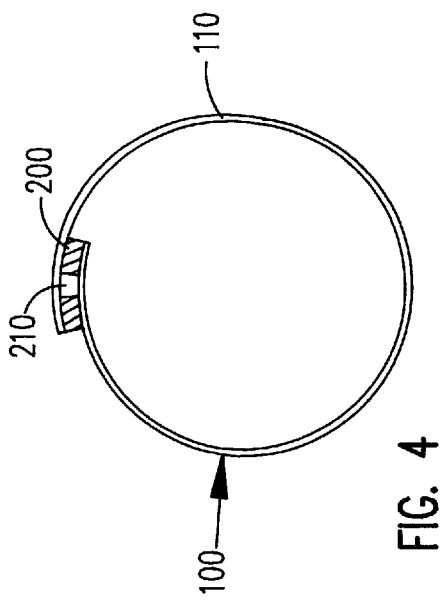
FIG. 4 is a cross-sectional view taken along the line A—A in FIG. 3.
Figure 6:
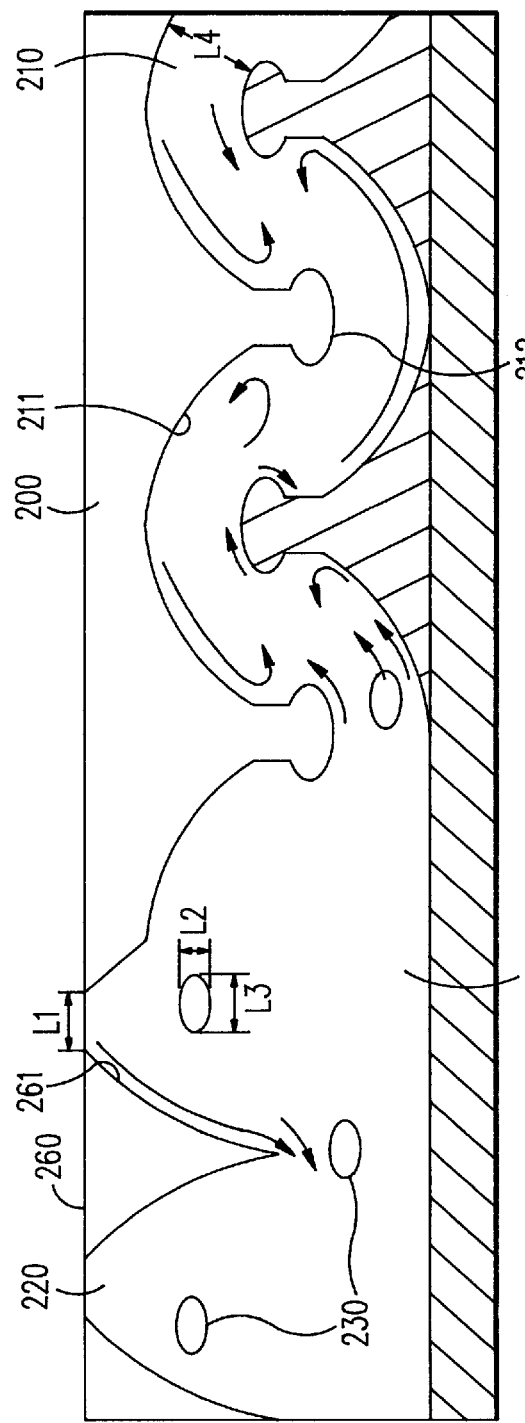
FIG. 6 is an enlarged cross-sectional view showing the principal part of the water-dropping tape in the present invention.

FIG. 5 is a cross-sectional view showing the principal part of the water-dropping tape in the present invention, and FIG. 6 is the enlarged view of FIG. 6.

Referring to FIGS. 5 and 6, the second water inlet 230 formed in the inner end portion of the main wall 110 has a sloping hole with a slant side 221 which is inclined in the direction of water flow, so that water can force the sediment to get out of the passage.

On the assumption that the first water inlet 220 has a length $L_1$, the second water inlet 230 has a width $L_2$ and a length $L_3$, and the snaking passage 210 has a width $L_4$, it is preferable to satisfy the expressions given by $L_1 > L_2$ and $2 \times L_2 = L_3 < L_4$.

In fabrication of the water-dropping tape of the present invention, the water path forming component 200 may be separately manufactured and integrally formed with the main wall 110 by way of an adhesive or solder. The water path forming component 200 may also be integrally formed with the one end portion of the main wall 110 and then combined with the other portion by application of an adhesive or solder. However, the present invention is not specifically limited to those fabrication methods and may be manufactured by any similar methods.

The operation of the present invention will be described as follows.

First, a plurality of water-dropping tapes 100 are connected to the main water pipe 10 by means of connections 20. The water path forming component 200 has a small width with a single water path being formed, whereby it is easy to connect the water-dropping tapes 100 with the main water pipe 10.

When water is supplied from the main water pipe 10 which is connected to the water-dropping tapes 100, the water in the water-dropping tapes 100 flows into the snaking passage 210 through the first and second water inlets 220 and 230 and meets with resistance caused by the bends 211 and spheroidal projections 212 on both side walls of the snaking passage 210, as illustrated in FIG. 6, dropping water pressure uniformly. The water is then discharged through the Y-shaped water outlets 240 formed in the outer end portion of the main wall 110.

Sediment blocking the passage 210 can be well separated and discharged with water stream, for the snaking passage 210 is provided with bends 211 and spheroidal projections 212 and the water inlets 230 are formed in sloping holes, thereby preventing the passage 210 from being clogged with sediment.

A plurality of water entrance portions 250 are formed in the middle of the snaking passage 210, so that even when one of the water entrance portions 250 has the first or second water inlet 220 or 230 blocked by sediment, water can flow into the first or second water inlet 220 or 230 of another water entrance portion 250, which leads to a prolongation of life of the tape in use.

As regards the conventional water-dropping tape which has round water outlets, water droplets are discharged in an excessively large amount and water discharge is not uniformly distributed in such a manner that water is discharged in an excessive amount at the beginning part of the water-dropping tape under high water pressure, while it is discharged in a too small amount at the end part of the water-dropping tape having low water pressure. Furthermore, the peripheral parts of the water outlets of the main wall formed from synthetic resin are weak in elasticity and have too narrow gaps for water stream, so that the sediment contained in the water blocks the outlets, making it difficult for water to flow.

In the present invention, the water outlets 240 of the main wall 110 have a Y-character shape water is discharged through the gaps of the Y-shaped outlets 240 which are enlarged with the peripheral parts of the outlets 240 being expanded elastically due to their material characteristics so as to produce a resistant force to suppress water discharge, thereby decreasing the amount of discharged water droplets and preventing the passage from being clogged with sediment. Accordingly, water can be discharged from a long distance under even pressure with a decrease in the amount of water droplets.

As described above, the water-dropping tape for crops in the present invention has a single water path unlike the conventional water-dropping tapes, so that it can be easily and closely connected to the main water pipe using connections.

Furthermore, the water entering the passage from the main water pipe flows with the water pressure uniformly decreased, because it is subjected to a resistance caused by the bends and spheroidal projections on both side walls of the passage.

Furthermore, sediment blocking the passage through which water is flowing is well separated and discharged with water stream, making it possible to prevent the passage from being clogged with sediment.

Particularly, a plurality of water inlets are arranged in the middle of the passage, and accordingly, even if one of the water entrance portions has a water inlet blocked, water can enter the water inlet of another adjacent water entrance portion, thereby prolonging the life of the water-dropping tape to a great extent.

Moreover, unlike the conventional round water outlets, the present invention is provided with Y-shaped water outlets whose material characteristics cause a resistance to suppress water discharge, decreasing the amount of water droplets, and the openings are expanded elastically to prevent the passage from being clogged. Accordingly, the entire amount of discharged water droplets can be decreased from a long distance under uniform water pressure.

With the present invention as described above, the water-dropping tape is easy to handle, and adapted to drop water with even distribution all over the area and prevent water paths from being clogged, prolonging the life for use to a great extent, thereby greatly improving the worth of products in use, further enhancing the crops farming efficiency and productivity.

While this invention has been described as having a preferred design, the present invention can be further modified within the spirit and scope of this disclosure. This application is therefore intended to cover any variations, uses, or adaptations of the invention using its general principals. Further, this application is intended to cover such departures from the present disclosure as come within known or customary practice in the art to which this invention pertains and which fall within the limits of the appended claims.

What is claimed is:

1. A water-dropping tape for crops, comprising:

a single snaking passage formed in the middle of a water path forming component disposed between the inner and outer end portions of a film-like main wall;

a plurality of water entrance portions arranged at predetermined intervals;

a water discharge portion disposed in the middle of the snaking passage between the water entrance portions;

first and second water inlets formed in the side wall of the water path forming component and the inner end portion of the main wall, and disposed in a region of the water entrance portion;

water outlets formed in the outer end portion of the main wall, and disposed in a region of the water discharge portion further comprising:

reciprocal bends formed successively in both side walls of the single passage;

spheroidal projections formed on the tops of the bends, wherein the first water inlets formed in the side walls of the water entrance portion and the second water inlets formed in the bottom surface of the water path forming component have a spheroidal shape; and wedge-shaped projections having curved surfaces on both sides thereof in the side walls of the water path forming component, and positioned between the first water inlets.

2. The water-dropping tape as defined in claim 1, wherein the water outlets of the main wall are bent in the Y-character form.

3. The water-dropping tape as defined in claim 1, wherein the water outlets of the water path forming component are in the form of a sloping hole inclined in the direction of water stream.

4. The water-dropping tape as defined in claim 1, wherein the water path forming component satisfies expressions given by where L1 is greater than L2 and 2×L2=L3 is less than L4, where L1 is the width of the first water inlet, L2 is the width of the second water inlet, L3 is the length of second water outlets, and L4 is the width of the passage.

* * * * *